Patented June 20, 1933

1,914,945

UNITED STATES PATENT OFFICE

GEORGE HOLLAND ELLIS AND HENRY CHARLES OLPIN, OF SPONDON, NEAR DERBY, ENGLAND, ASSIGNORS TO CELANESE CORPORATION OF AMERICA, A CORPORATION OF DELAWARE

COLORATION OF MATERIALS

No Drawing. Application filed July 28, 1928, Serial No. 296,084, and in Great Britain August 16, 1927.

This invention relates to the treatment of materials and especially of materials such as filaments, fibres, threads, fabrics or films, made of or containing cellulose esters, for example cellulose acetate, propionate or butyrate, to obtain fast colorations.

We have found that colorations such as dyeings, printings or stencillings more especially on materials made of or containing cellulose esters produced with certain anthraquinone derivatives, and more particularly with amino anthraquinone, i. e. derivatives containing free amino, alkyl amino or aryl amino groups whether or not they contain other nuclear substituents for example mercapto, hydroxy, alkoxy, halogen or nitro groups, are not fast to the combined agencies of acid and light. In view of the fact that the commercial treatments of materials frequently entail subjecting the materials to acid treatments this lack of fastness constitutes a serious drawback to the use of anthraquinone derivatives, and particularly those specified, for the production of colorations, since the colored materials are practically always exposed to light subsequently.

According to the present invention dyeings, printings, stencillings or other colorations, especially those on materials made of or containing cellulose esters, produced with amino anthraquinone, i. e. derivatives, and particularly anthraquinone derivatives containing free amino, alkyl amino or aryl amino groups, are rendered fast by depriving the fibre, fabric or other material of any deleterious acid reaction.

This may be achieved by rinsing or washing the materials, preferably after the dyeing or other coloration, until they are substantially or entirely acid-free, but is most advantageously effected by incorporating in the materials at any stage of their production or treatment, and most conveniently during the dyeing or otherwise coloring or during a finishing or other after treatment, one or more substances containing an inorganic base and having an alkaline reaction. Such substances are for example sodium carbonate, borax, disodium hydrogen phosphate, sodium acetate, sodium palmitate and potassium oleate, but it will be understood that these examples are purely illustrative and in no way limitative.

In the treatment of materials made of or containing cellulose esters, the substances are preferably not sufficiently basic or alkaline or are not applied in sufficient concentration to produce a deleterious degree of hydrolysis of the cellulose ester.

The following examples illustrate the invention but are not intended to limit it in any way:—

Example 1

Cellulose acetate artificial silk in the form of threads is first dyed in any suitable manner with sufficient 1.4-diamino-anthraquinone to give the desired shade. The material, after dyeing, is rinsed in water containing 2 grams of borax per litre and is dried without further rinsing.

Example 2

Cellulose acetate artificial silk in any form is dyed with 1-mono methyl amino-4-hydroxy-anthraquinone and is then treated in a bath containing 2 grams of sodium carbonate per litre and dried without rinsing.

Though the invention has been described above more particularly with reference to the treatment of materials made of or containing cellulose esters, for example cellulose acetate, it is also applicable to the treatment of any other materials, which can be dyed or otherwise colored with anthraquinone derivatives (particularly those containing free amino, alkyl amino or aryl amino groups), such as of wool, silk, cellulose esters, etc., and to the treatment of mixed materials.

What we claim and desire to secure by Letters Patent is:—

1. Process of improving the fastness to the combined agency of acid and light of colorations produced with anthraquinone derivatives, comprising incorporating in the material a substance containing a salt having an alkaline reaction.

2. Process of improving the fastness to the combined agency of acid and light of colorations produced with anthraquinone derivatives containing amino groups, comprising incorporating in the material a substance containing a salt having an alkaline reaction.

3. Process of improving the fastness to the combined agency of acid and light of colorations produced with anthraquinone derivatives, comprising incorporating in the material after dyeing a substance containing a salt having an alkaline reaction.

4. Process of improving the fastness to the combined agency of acid and light of colorations produced with anthraquinone derivatives containing amino groups, comprising incorporating in the material after dyeing a substance containing a salt having an alkaline reaction.

5. Process of improving the fastness to the combined agency of acid and light of colorations produced with anthraquinone derivatives, comprising incorporating in the material a sodium salt having an alkaline reaction.

6. Process of improving the fastness to the combined agency of acid and light of colorations produced with anthraquinone derivatives containing amino groups, comprising incorporating in the material a sodium salt having an alkaline reaction.

7. Process of improving the fastness to the combined agency of acid and light of colorations produced with anthraquinone derivatives on materials comprising cellulose esters comprising incorporating in the material a substance containing a salt having an alkaline reaction.

8. Process of improving the fastness to the combined agency of acid and light of colorations produced with anthraquinone derivatives containing amino groups on materials comprising cellulose esters, comprising incorporating in the material a substance containing a salt having an alkaline reaction.

9. Process of improving the fastness to the combined agency of acid and light of colorations produced with anthraquinone derivatives on materials comprising cellulose esters, comprising incorporating in the material after dyeing a substance containing a salt having an alkaline reaction.

10. Process of improving the fastness to the combined agency of acid and light of colorations produced with anthraquinone derivatives containing amino groups on materials comprising cellulose esters, comprising incorporating in the material after dyeing a substance containing a salt having an alkaline reaction.

11. Process of improving the fastness to the combined agency of acid and light of colorations produced with anthraquinone derivatives on materials comprising cellulose esters, comprising incorporating in the material a sodium salt having an alkaline reaction.

12. Process of improving the fastness to the combined agency of acid and light of colorations produced with anthraquinone derivatives containing amino groups on materials comprising cellulose esters, comprising incorporating in the material a sodium salt having an alkaline reaction.

13. Process of improving the fastness to the combined agency of acid and light of colorations produced with anthraquinone derivatives on materials comprising cellulose acetate, comprising incorporating in the material a substance containing a salt having an alkaline reaction.

14. Process of improving the fastness to the combined agency of acid and light of colorations produced with anthraquinone derivatives containing amino groups on materials comprising cellulose acetate, comprising incorporating in the material a substance containing a salt having an alkaline reaction.

15. Process of improving the fastness to the combined agency of acid and light of colorations produced with anthraquinone derivatives on materials comprising cellulose acetate, comprising incorporating in the material after dyeing a substance containing a salt having an alkaline reaction.

16. Process of improving the fastness to the combined agency of acid and light of colorations produced with anthraquinone derivatives containing amino groups on materials comprising cellulose acetate, comprising incorporating in the material after dyeing a substance containing a salt having an alkaline reaction.

17. Process of improving the fastness to the combined agency of acid and light of colorations produced with anthraquinone derivatives on materials comprising cellulose acetate, comprising incorporating in the material a sodium salt having an alkaline reaction.

18. Process of improving the fastness to the combined agency of acid and light of colorations produced with anthraquinone derivatives containing amino groups on materials comprising cellulose acetate, comprising incorporating in the material a sodium salt having an alkaline reaction.

19. Process of improving the fastness to the combined agency of acid and light of colorations produced with anthraquinone derivatives containing amino groups on materials comprising cellulose acetate to acid and light, comprising incorporating in the material a substance containing a salt having an alkaline reaction but insufficiently alkaline to cause a deleterious degree of hydrolysis of the cellulose acetate.

In testimony whereof we have hereunto subscribed our names.

GEORGE HOLLAND ELLIS.
HENRY CHARLES OLPIN.

CERTIFICATE OF CORRECTION.

Patent No. 1,914,945. June 20, 1933.

GEORGE HOLLAND ELLIS, ET AL.

It is hereby certified that error appears in the printed specification of the above numbered patent requiring correction as follows: Page 1, line 88, for "esters" read "ethers"; and that the said Letters Patent should be read with this correction therein that the same may conform to the record of the case in the Patent Office.

Signed and sealed this 22nd day of August, A. D. 1933.

M. J. Moore.

(Seal) Acting Commissioner of Patents.